United States Patent
Toma

(10) Patent No.: US 6,583,818 B1
(45) Date of Patent: Jun. 24, 2003

(54) SOLID STATE IMAGE SENSOR WITH READOUT MODES HAVING DIFFERENT DRIVE PHASES

(75) Inventor: Tetsuo Toma, Miyagi (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/201,897

(22) Filed: Nov. 30, 1998

(30) Foreign Application Priority Data

Dec. 1, 1997 (JP) .............................. 9-330414

(51) Int. Cl.[7] .................................. H04N 3/14
(52) U.S. Cl. ...................... 348/312; 348/317; 348/322; 257/242; 377/62; 377/63
(58) Field of Search ................................ 348/311, 312, 348/317, 320, 322; 377/54, 62, 63, 61; 257/242, 245, 247

(56) References Cited

U.S. PATENT DOCUMENTS

| 5,528,291 A | 6/1996 | Oda ........................... 348/220 |
| 5,608,455 A | 3/1997 | Oda ........................... 348/245 |

FOREIGN PATENT DOCUMENTS

| JP | 08-009266 | 1/1996 | |
| JP | 08-331461 | 12/1996 | |
| JP | 09-149319 | 6/1997 | |
| JP | 41112253 A | * 4/1999 | .......... H04N/5/335 |

OTHER PUBLICATIONS

Furumiya, M et al, "A 30Frames/s ⅔Inch 1.3M Pixel Progressive Scan IT–CCD Image Sensor", 1997 IEEE International Solid–State Circuits Conference, pp. 188–189 and 454, Feb. 1997.*

* cited by examiner

Primary Examiner—Wendy R. Garber
Assistant Examiner—Matthew L Rosendale
(74) Attorney, Agent, or Firm—Sughrue Mion, PLLC

(57) ABSTRACT

A solid state image pickup device having: a mode selector for selecting one of first and second modes; a plurality of photoelectric converters for converting received light into electric charges; transfer paths each having a plurality of packets for receiving the electric charges from the plurality of photoelectric converters and transferring the electric charges in each packet; a controller for reading the electric charges from each of the plurality of photoelectric converters and supplying the read electric charges to the transfer paths; and a driver for driving the transfer means in the selected first or second mode at the number of drive phases different from the number of drive phases of the non-selected mode.

13 Claims, 10 Drawing Sheets

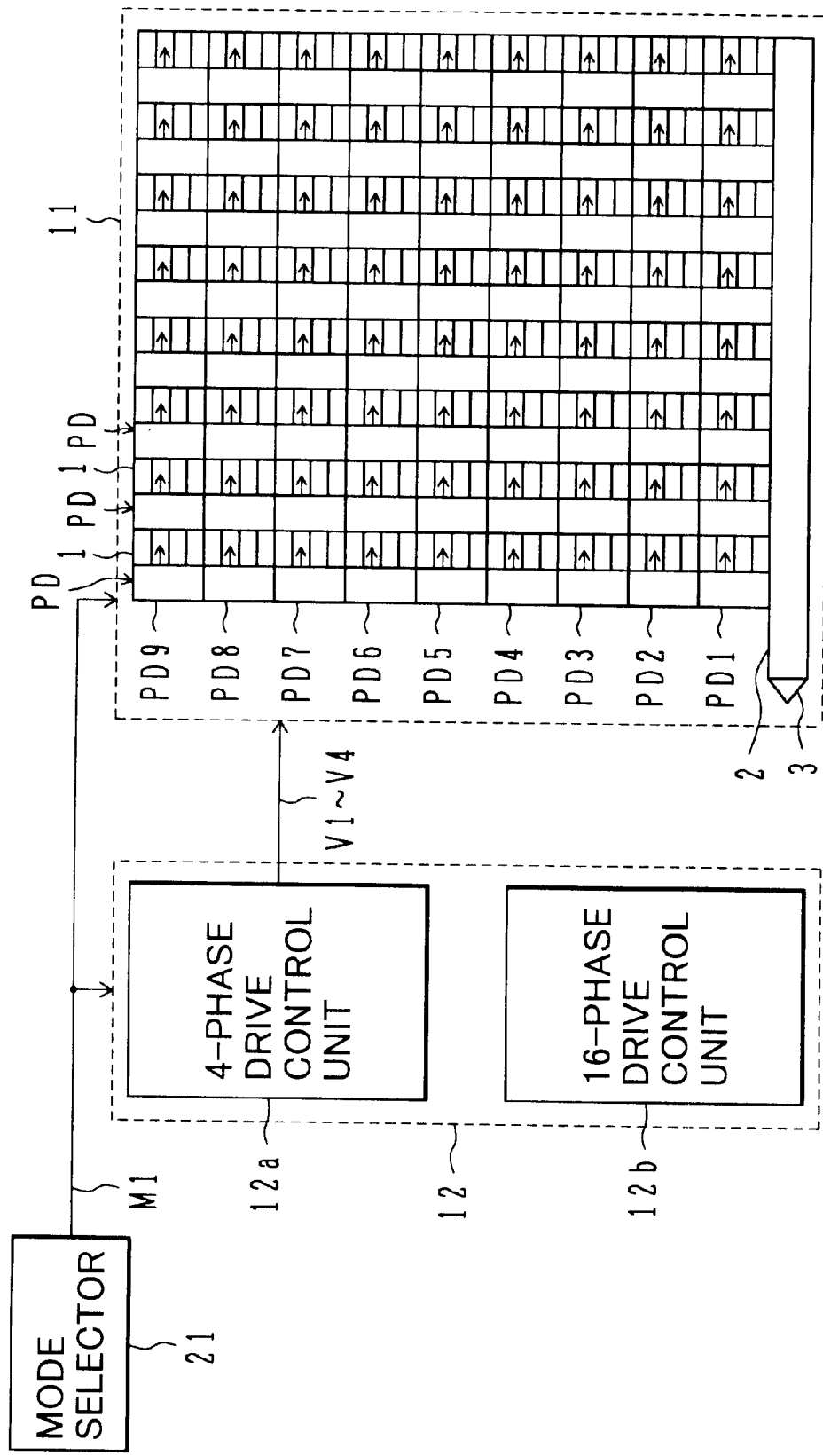

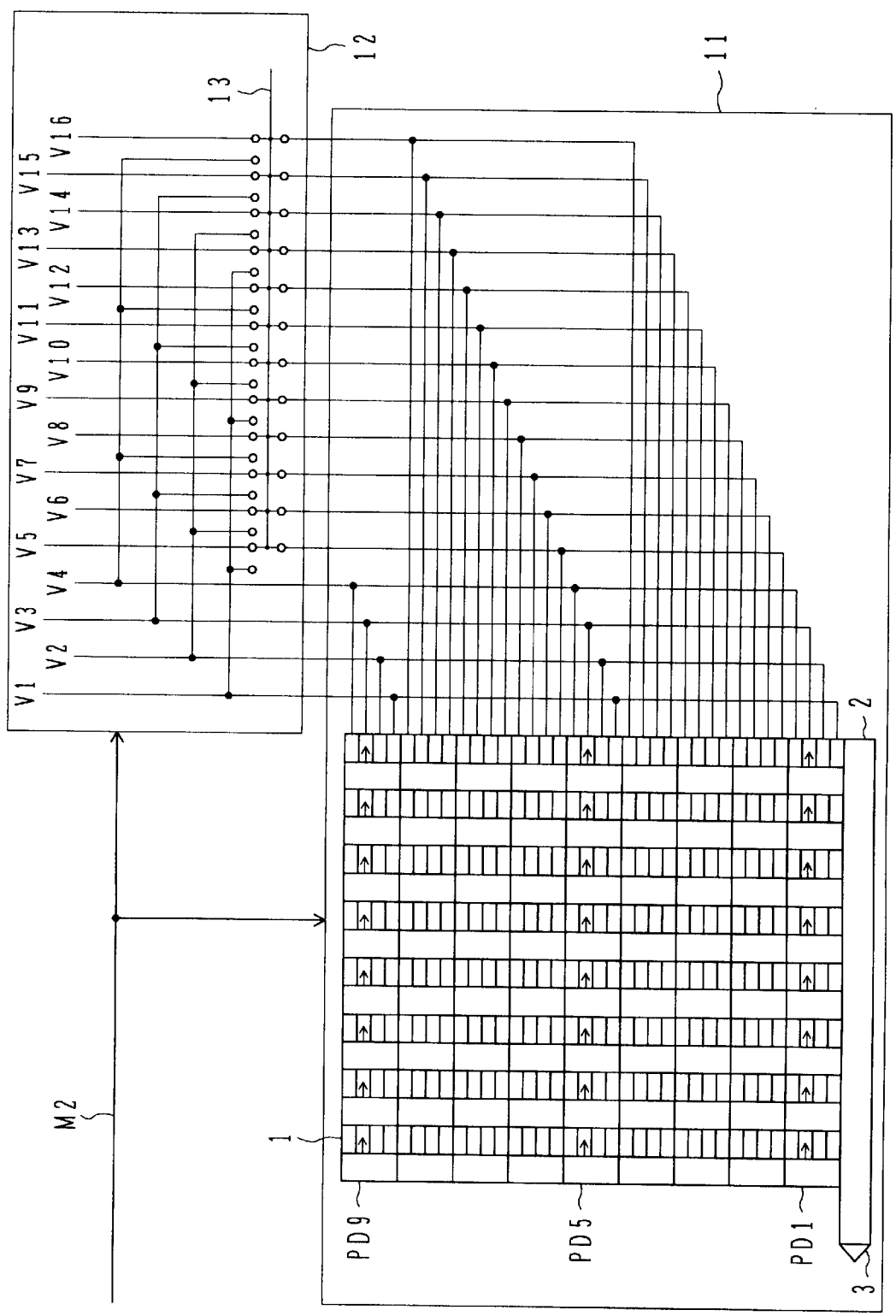

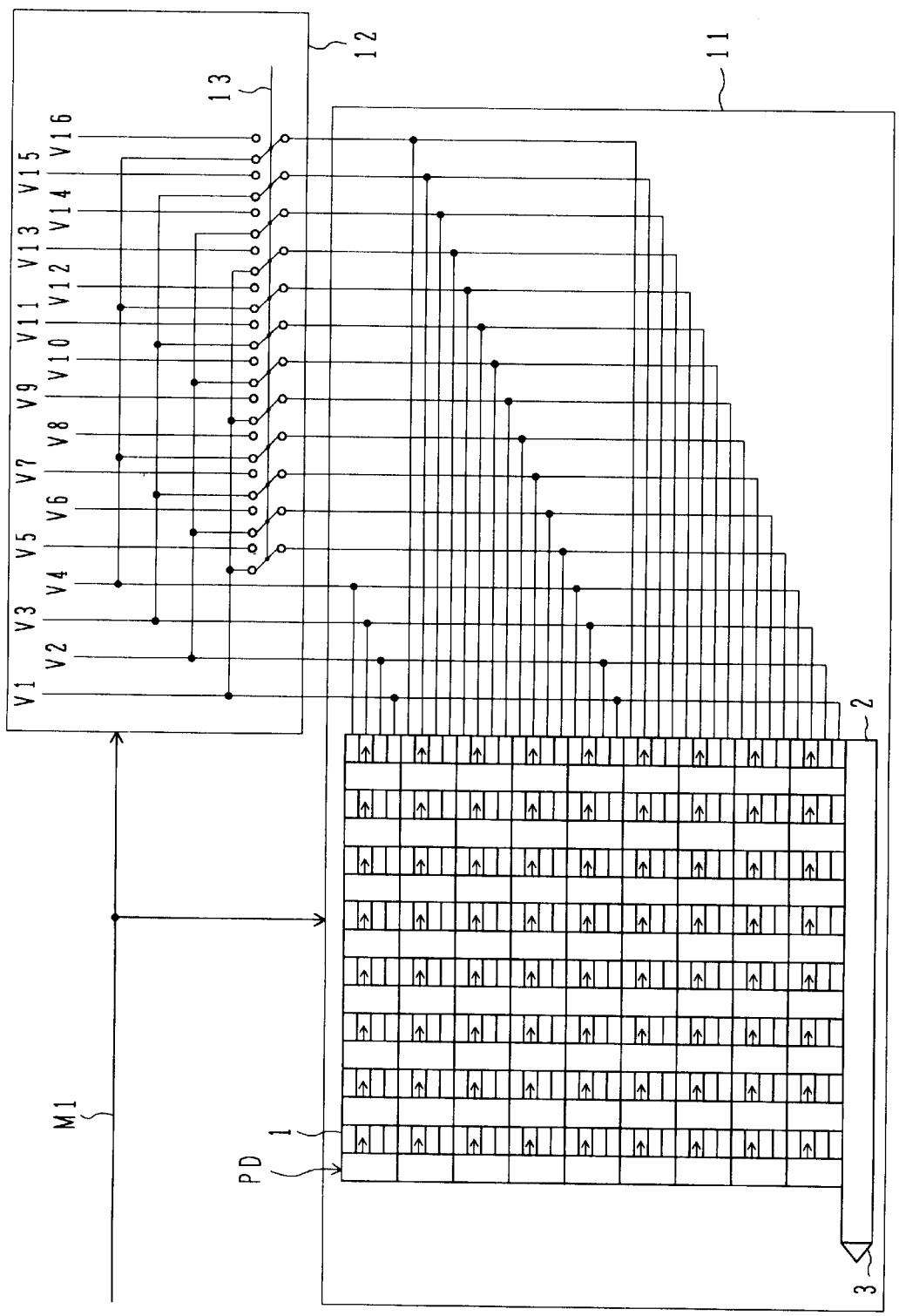

SOLID STATE IMAGE SENSOR WITH READOUT MODES HAVING DIFFERENT DRIVE PHASES

This application is based on Japanese patent application No. 9-330414 filed on Dec. 1, 1997, the entire contents of which are incorporated herein by reference.

BACKGROUND OF THE INVENTION a) Field of the Invention

The present invention relates to image signal processing technologies, and more particularly to technologies of processing image signals picked up with a solid state image pickup device.

b) Description of the Related Art

FIGS. 2A and 2B show a solid state image pickup device according to conventional technologies. For example, the image pickup device can pick up an image of high resolution of 1530×1024 pixels. FIG. 2A illustrates a control method for the solid state image pickup device operating in a first mode, and FIG. 2B illustrates a control method for the solid state image pickup device operating in a second mode.

Referring to FIG. 2A, the first mode is an all-pixel read mode and reads all pixels, for example, 1530×1024 pixels, of the image pickup device. The first mode is used, for example, for printing an image of high precision with a printer.

The solid state image pickup device has photodiodes PD, vertical transfer paths 1, a horizontal transfer path 2, and an amplifier 3. The photodiodes PD as many as the number of pixels forming a full image are actually disposed in a two-dimensional matrix shape. For example, the number of pixels in the horizontal direction is 1530, and the number of pixels in the vertical direction is 1024. In FIG. 2A, however, one column is shown constituted of nine photodiodes PD1 to PD9, for the simplicity of drawing. All or each of the photodiodes PD1 to PD9 is called hereinafter a photodiode PD where applicable.

The solid state image pickup device has a plurality of photodiodes PD disposed in a two-dimensional shape and a plurality column of vertical transfer paths 1. One photodiode corresponds to one pixel constituting a two-dimensional image and converts received light into electric charges.

In the first mode, charges are read from all the photodiodes PD1 to PD9 and supplied to the right vertical transfer paths 1. The vertical transfer path 1 has four electrodes per one photodiode PD. The four electrodes are supplied with transfer pulses V1 to V4. The vertical transfer path 1 is four-phase driven with the transfer pulses V1 to V4 to transfer charges in the vertical direction.

The charges on the vertical transfer path 1 are transferred in the downward vertical direction to the horizontal transfer path 2. The horizontal transfer path 2 transfers the charges in the leftward horizontal direction. The amplifier 3 amplifies the charges transferred from the horizontal transfer path 2 and outputs amplified image signals.

Referring to FIG. 2B, the second mode is a thinning read mode. For example, an image of 1530 (H) and 1024 (V) pixels is thinned to read an image of 1530 (H)×256 (V) pixels. Namely, three pixels among four pixels are thinned in the vertical direction to read 256 pixels among 1024 pixels.

For example, the second mode is used for displaying an image on a small liquid crystal display mounted on a camera for adjusting an angle of view or is used for reading an image when auto focus is performed. The second mode is required to read one-field image at high speed (1/60 sec to 1/30 sec).

In the second mode, electric charges are read from every fourth pixels, photodiodes PD1, PD5, and PD9 in the vertical direction, and supplied to the right side vertical transfer paths 1. Sets of four electrodes of the vertical transfer path 1 are supplied with the transfer pulses V1 to V4 similar to the first mode. The vertical transfer path 1 is four-phase driven with the transfer pulses V1 to V4 to transfer charges read from every fourth pixels along the vertical direction, in the downward vertical direction. The horizontal transfer path 2 transfers charges received from the vertical transfer paths 1 in the leftward horizontal direction. The amplifier 3 amplifies the charges transferred from the horizontal transfer path 1 and outputs amplified image signals.

The solid state image pickup device has such first and second modes. In any of the first and second modes, the vertical transfer path 1 is four-phase driven with the four electrodes. Next, a four-electrode four-phase drive method will be described.

FIG. 3 is a timing chart of the transfer pulses V1 to V4. The abscissa represents a time t, a unit time being an overlap time of one transfer pulse upon another transfer pulse.

FIG. 4 is a potential transition diagram of the vertical transfer path where the ordinate represents the time t shown in FIG. 3 and the abscissa represents a vertical position along the vertical transfer path 1. For example, eight photodiodes PD1 to PD8 are disposed in the vertical direction and connected to one vertical transfer path. Four electrodes per one photodiode PD are provided on the vertical transfer path. The four electrodes are supplied with the transfer pulses V1 to V4. Electric charges are accumulated in a low potential region. As seen from this potential transition diagram, as the potential changes, electric charges are transferred from the right to left in FIG. 4 along the vertical transfer path. Hatched photodiodes PD1 and PD5 are read in the thinning second mode.

Hatched charges 5 are at the height of the vertical transfer path same as that of the photodiode PD5 at the time t=0. As the time lapses, the charges 5 are transferred in the vertical direction (left side in FIG. 4). At time t=32, the charges are at the height of the vertical transfer path same as that of the photodiode PD1. It takes therefore 32 cycles to transfer the charges 5 from the height of the photodiode PD5 to the height of the photodiode PD1.

As shown in FIG. 4, one charge accumulation region (packet) per one photodiode PD is formed along the vertical transfer path. The packet is a region where electric charges can be accumulated. There are a packet with charges and a packet (empty packet) without charges. It is possible to efficiently transfer electric charges along the vertical transfer path in the first mode.

However, in the second mode (thinning read mode), for example, three packets among four packets are thinned. Therefore, the three packets among the four packets along the vertical transfer path are wasteful packets. It cannot be said therefore that the charge transfer along the vertical transfer path is efficient in the second mode.

SUMMARY OF THE INVENTION

It is an object of the present invention to provide a solid state image pickup device and an electric charge transfer method capable of transferring electric charges in the vertical direction at high speed in both an all-pixel read mode and a thinning read mode.

According to one aspect of the present invention, there is provided a solid state image pickup device comprising: mode selecting means for selecting one of first and second modes; a plurality of photoelectric converters for converting received light into electric charges; transfer means having a plurality of packets for receiving the electric charges from the plurality of photoelectric converters and transferring the electric charges in each packet; gate means for reading the electric charges from each of the plurality of photoelectric converters and supplying the read electric charges to the transfer means; and drive means for driving the transfer means in the selected first or second mode at the number of drive phases different from the number of drive phases of the non-selected mode.

For example, the first mode is an all-pixel read mode and the second mode is a thinning read mode. For example, the drive means drives the transfer means with four phases in the first mode and with sixteen phases in the second mode. The solid state image pickup device can drive the transfer means with the number of drive phases suitable for the selected mode.

The solid state image pickup device can transfer charges efficiently and at high speed both in the first and second modes. As the number of drive phases is increased, the charge transfer capacity can be increased.

According to another aspect of the present invention, there is provided a charge transfer method comprising the steps of: (a) selecting one of first and second modes; (b) reading electric charges from each of a plurality of photoelectric converters and supplying the read electric charges to transfer means; and (c) driving the transfer means in the selected first or second mode at the number of drive phases different from the number of drive phases of the non-selected mode.

BRIEF DESCRIPTION OF THE DRAWINGS

FIG. 1A is a conceptual diagram showing a solid state image pickup device operating in a first mode according to an embodiment of the invention.

FIG. 5A is a plan view of a solid state image pickup device reading a field A, and FIG. 5B is a plan view of the solid state image pickup device reading a field B.

FIG. 6 is a plan view showing a solid state image pickup device operating in the second mode according to the embodiment of the invention.

FIG. 9 is a plan view of a solid state image pickup device operating in the first mode according to the embodiment of the invention.

DETAILED DESCRIPTION OF THE PREFERRED EMBODIMENTS

Figure 1B:
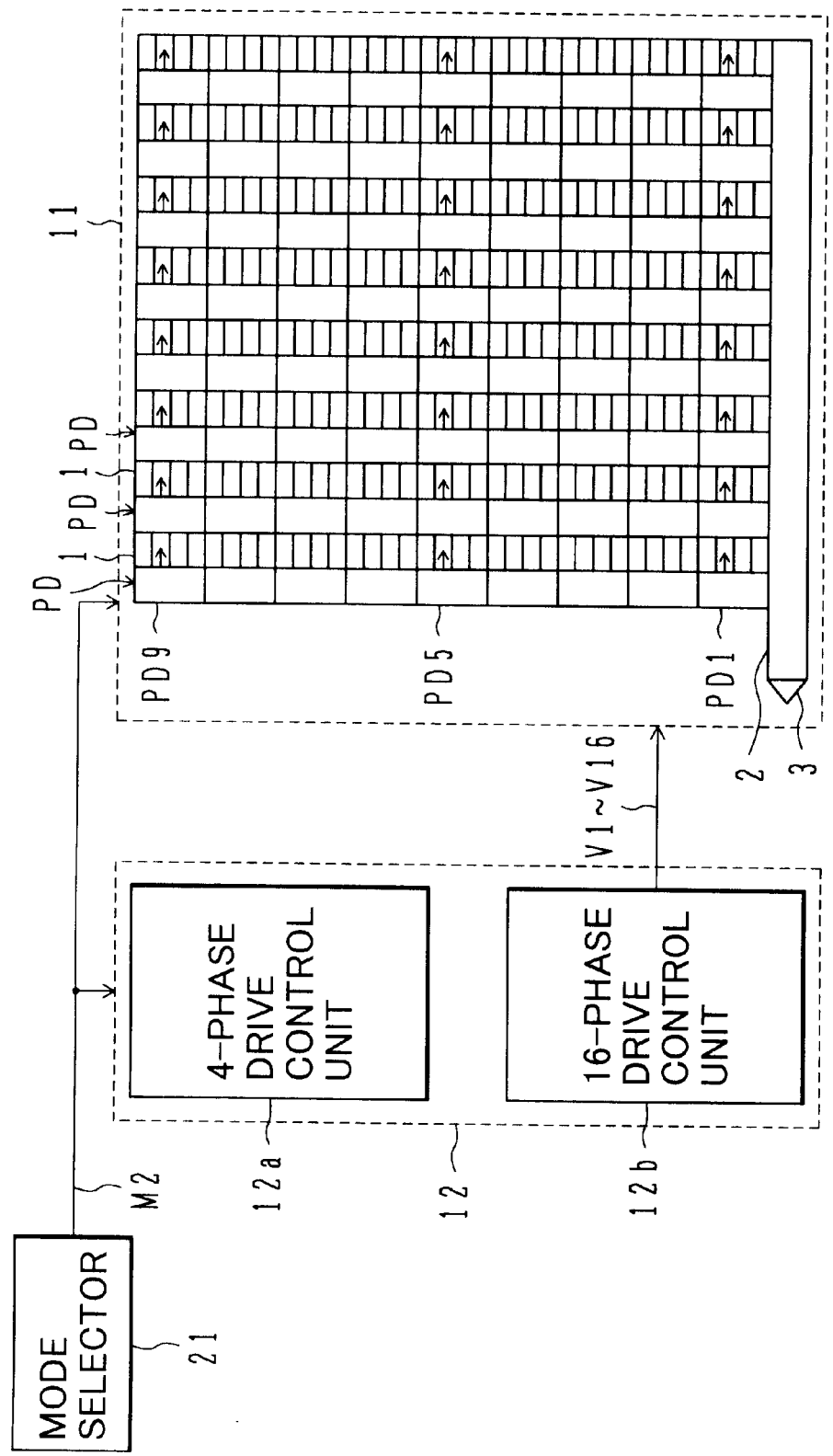
FIG. 1B is a conceptual diagram showing the solid state image pickup device operating in a second mode according to the embodiment.

FIGS. 1A and 1B are conceptual diagrams showing a solid state image pickup device according to an embodiment of the invention. For example, the solid state image pickup device can pick up an image of high resolution of horizontal 1530 (H)×vertical 1024 (V) pixels. FIG. 1A illustrates a control method for the solid state image pickup device in the first mode, and FIG. 1B illustrates a control method for the solid state image pickup device in the second mode.

For the general background of solid state image pickup device, for example, refer to U.S. Pat. Nos. 5,528,291 and 5,608,455 which are herein incorporated by reference.

The solid state image pickup device is mounted, for example, on a camera. A mode selector 21 is provided in the camera in or out of the solid state image pickup device. The mode selector 21 selects either a mode signal M1 or a mode signal M2 and supplies it to a charge coupled device (CCD) chip 11.

Referring to FIG. 1A, the first mode is an all-pixel read mode and reads all pixels, for example, 1530 (H)×1024 (V) pixels, of the image pickup device. The first mode is used, for example, for printing an image of high precision with a printer.

The solid state image pickup device has the charge coupled device (CCD) chip 1 and a vertical transfer controller 12. In the first mode, the mode selector 21 supplies the first mode signal M1 to the CCD chip 11 and vertical transfer controller 12.

The CCD chip 11 has photodiodes (photoelectric conversion elements) PD and vertical transfer paths 1, a horizontal transfer path 2, and an amplifier 3. The vertical transfer paths 1 and horizontal transfer path 2 are formed in the charge coupled device (CCD) chip 11. The vertical transfer controller 12 has a 4-phase drive control unit 12a and a 16-phase drive control unit 12b. The vertical transfer controller 12 controls charge transfer in the vertical transfer paths 1.

The photodiodes PD as many as the number of pixels forming a full image (1530×1024) are actually disposed in a two-dimensional matrix shape. In FIG. 1A, however, one column is shown constituted of nine photodiodes PD1 to PD9, for the simplicity of drawing.

The solid state image pickup device has a plurality of photodiodes PD disposed in a two-dimensional shape and a plurality column of vertical transfer paths 1. One photodiode corresponds to one pixel constituting a two-dimensional image and converts received light into electric charges.

As the first mode signal M1 is supplied to the CCD chip 11, the CCD chip 11 reads electric charges in all the photodiodes PD1 to PD9 and supplies them to the right vertical transfer paths 1. The CCD chip 11 controls to read charges from the photodiodes PD and supply them to the vertical transfer paths 1, in response to the first mode signal M1. Instead of the CCD chip 11, the vertical transfer controller 12 may control to read charges in response to the first mode signal M1. The vertical transfer path 1 has four electrodes per one photodiode PD.

As the first mode signal M1 is supplied to the vertical transfer controller 12, the 4-phase drive control unit 12a of the vertical transfer controller 12 is selected. The four-phase drive control unit 12a supplies the four electrodes in the CCD chip 11 with transfer pulses V1 to V4. The vertical transfer path 1 is four-phase driven with the transfer pulses V1 to V4 to transfer charges in the vertical direction.

The charges on the vertical transfer path 1 are transferred in the downward vertical direction and supplied to the horizontal transfer path 2. The horizontal transfer path 2 transfers the charges in the leftward horizontal direction. The amplifier 3 amplifies the charges transferred from the horizontal transfer path 2 and outputs amplified image signals.

Referring to FIG. 1B, the second mode is a thinning read mode. For example, an image of horizontal 1530 (H) and vertical 1024 (V) pixels is thinned to read an image of 1530 (H)×256 (V) pixels. Namely, three pixels among four pixels are thinned in the vertical direction to read 256 pixels among 1024 pixels. Electric charges may be thinned not only in the vertical direction but also in the horizontal direction.

For example, the second mode is used for displaying an image on a small liquid crystal display mounted on a camera for adjusting an angle of view or is used for reading an image when auto focus is performed.

In the second mode, the mode selector 21 supplies the second mode signal M2 to the CCD chip 11 and vertical transfer controller 12.

As the second mode signal M2 is supplied to the CCD chip 11, the CCD chip 11 reads electric charges from every fourth pixels, photodiodes PD1, PD5, and PD9 in the vertical direction, and transfers them to the right side vertical transfer paths 1. The CCD chip 11 controls to read charges from the photodiodes PD and supply them to the vertical transfer paths 1, in response to the second mode signal M2. Instead of the CCD chip 11, the vertical transfer controller 12 may control to read charges in response to the second mode signal M2. The vertical transfer path has four electrodes per one photodiode PD, and so sixteen electrodes per four photodiodes PD.

As the second mode signal M2 is supplied to the vertical transfer controller 12, the 16-phase drive control unit 12b of the vertical transfer controller 12 is selected. The 16-phase drive control unit 12b supplies the sixteen electrodes in the CCD chip 11 with transfer pulses V1 to V16. The vertical transfer path 1 is 16-phase driven with the transfer pulses V1 to V16 and transfers thinned read charges in the vertical direction. By 16-phase driving the vertical transfer path 1, thinned read charges can be transferred more efficiently and at higher speed than the 4-phase drive. The reason for this will be later described with reference to the timing chart shown in FIG. 8.

Electric charges on the vertical paths 1 are transferred in the downward vertical direction to the horizontal transfer path 2. The horizontal transfer path 2 transfers the received charges in the leftward horizontal direction. The amplifier 3 amplifies the charges transferred from the horizontal transfer path 1 and outputs amplified image signals.

As described above, the vertical transfer path 1 is 4-phase driven in the first mode, and 16-phase driven in the second mode. Since the number of drive phases is changed with the selected mode, vertical transfer suitable for each mode can be performed. Namely, efficient and high speed vertical charge transfer becomes possible for both the first and second modes.

The second mode is the thinning read mode and is applicable to both the non-interlace scheme and interlace scheme. Next, the operation for the interlace scheme will be described.

Figure 5A:
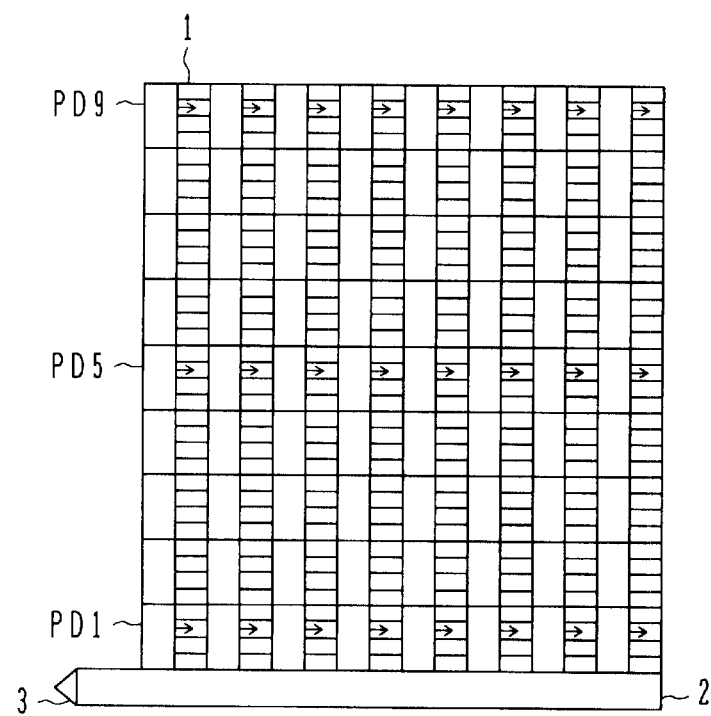
FIGS. 5A and 5B illustrate an interlace read method.
Figure 5B:
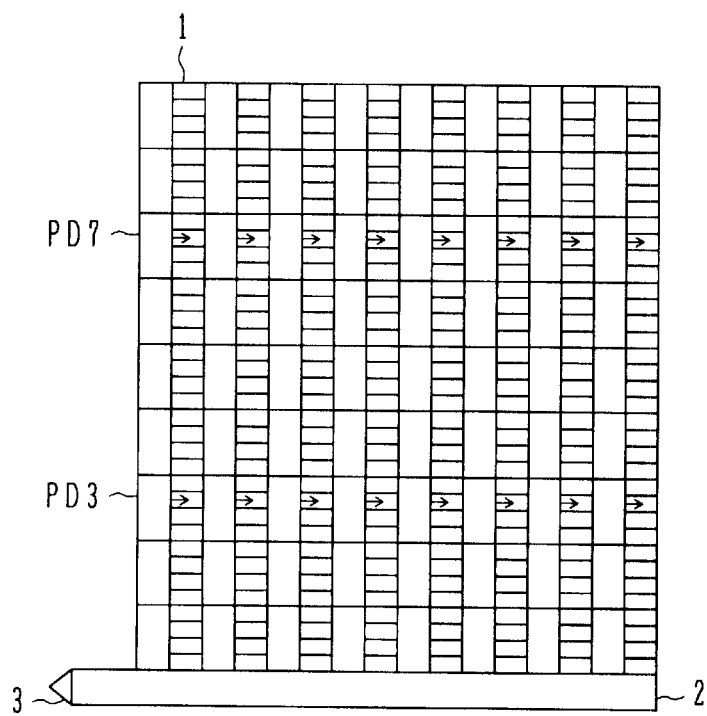

FIGS. 5A and 5B illustrate an operation of reading an image in the second mode with the interlace scheme. With the interlace scheme, one frame is constituted of two fields A and B. FIG. 5A schematically shows a solid state image pickup device reading the field A, and FIG. 5B schematically shows the solid state image pickup device reading the field B.

An image of 1530 (H)×1024 (V) pixels on the solid state image pickup device is thinned to read an image of 1530 (H)×512 (V) pixels. Three pixels among four pixels in the vertical direction are thinned to read 156 pixels per one field in the vertical direction (512 pixels per one frame in the vertical direction) among 1024 pixels in the vertical direction. Charges may be thinned not only in the vertical direction but also in the horizontal direction. The thinned image is in conformity with the National Television System Committee (NTSC) format so that the image can be displayed on a general monitor.

Referring to FIG. 5A, in reading the field A, electric charges in every fourth pixels in the vertical direction, i.e., photodiodes PD1, PD5, and PD9, are read and supplied to the leftward vertical transfer path 1. Namely, one pixel per four pixels in the vertical direction is read. Upon reception of the second mode signal, the vertical transfer path 1 is 16-phase driven to transfer read charges thinned in the vertical direction, in the downward vertical direction. The horizontal transfer path 2 transfers the charges received from the vertical transfer paths 1 in the leftward horizontal direction. The amplifier 3 amplifies the charges transferred from the horizontal transfer path 1 and outputs amplified image signals.

Referring to FIG. 5B, in reading the field B, electric charges in every fourth pixels shifted in the vertical direction by two pixels, i.e., photodiodes PD3 and PD7, are read and supplied to the leftward vertical transfer path 1. Namely, one pixel per four pixels in the vertical direction is read. Upon reception of the second mode signal, the vertical transfer path 1 is 16-phase driven to transfer read charges in the downward vertical direction. The horizontal transfer path 2 transfers the charges received from the vertical transfer paths 1 in the leftward horizontal direction. The amplifier 3 amplifies the charges transferred from the horizontal transfer path 1 and outputs amplified image signals.

Next, a specific operation of the solid state image pickup device will be described by taking as an example reading the field A. First, the control method in the second mode will be described with reference to FIG. 6, and then the control method in the first mode will be described with reference to FIG. 9.

FIG. 6 shows the structure of a solid state image pickup device in the second mode.

As described earlier, the solid state image pickup device has a CCD chip 11 and a vertical transfer controller 12. The CCD chip 11 has photodiodes PD disposed in a two-dimensional shape, a plurality column of vertical transfer paths 1, a horizontal transfer path 2, and an amplifier 3.

Figure 7:
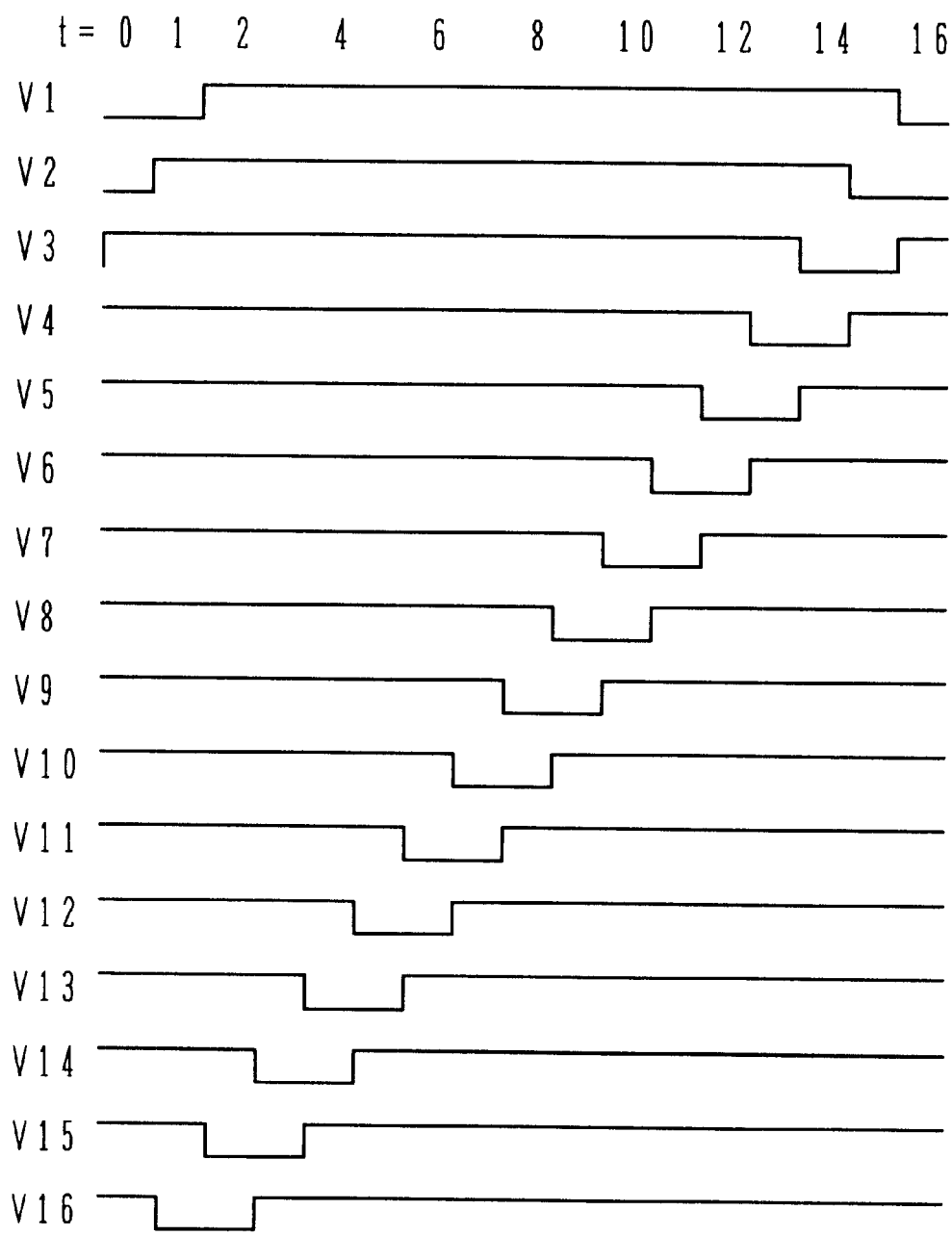
FIG. 7 is a timing chart of drive pulses used for 16-electrode 16-phase drive.

Upon reception of the second mode signal M2, the vertical transfer controller 12 generates 16-phase drive pulses V1 to V16 shown in FIG. 7 and controls switches 13 shown in FIG. 6. FIG. 7 is a timing chart of the transfer pulses V1 to V16, with the abscissa representing the time t similar to FIG. 3. The vertical transfer controller 12 closes the switches 13 corresponding to the pulses V5 to V16 to supply the 16-phase pulses V1 to V16 to the CCD chip 11. The pulses V1 to V4 are always supplied to the CCD chip 11.

The vertical transfer path 1 has four electrodes per one photodiode PD, and so sixteen electrodes per four photodiodes PD. The sixteen electrodes are supplied with the transfer pulses V1 to V16. The vertical transfer path 1 is 16-phase driven with the transfer pulses V1 to V16 to transfer charges read from the photodiodes PD1, PD5, and PD9 in the vertical direction.

Figure 4:
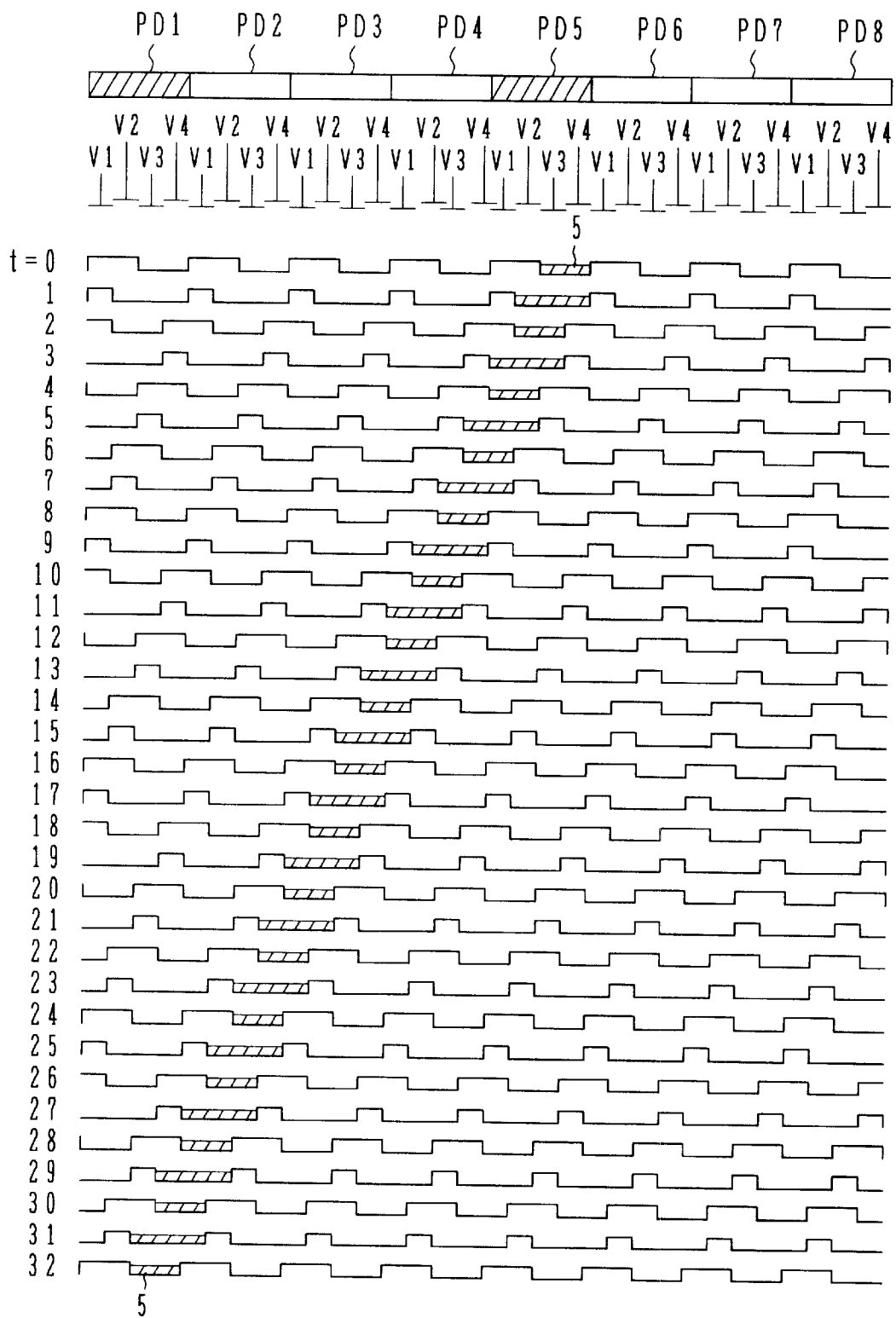
FIG. 4 is a potential transition diagram illustrating four-electrode four-phase drive.
Figure 8:
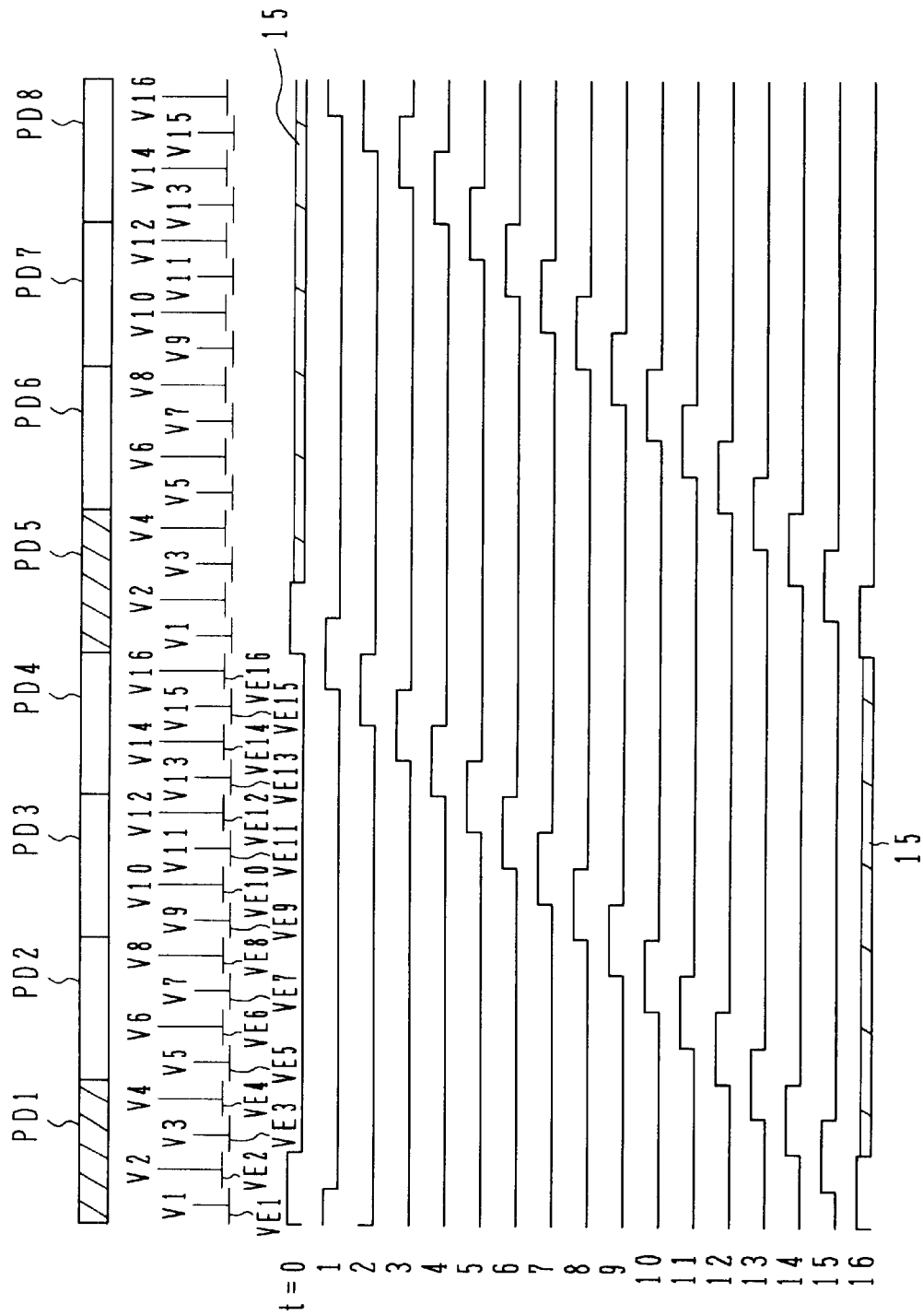
FIG. 8 is a potential transition diagram illustrating 16-electrode 16-phase drive.

FIG. 8 is a potential transition diagram of the vertical transfer path similar to the diagram shown in FIG. 4. The ordinate represents the time t shown in FIG. 7 and the abscissa represents a vertical position along the vertical transfer path 1. For example, eight photodiodes PD1 to PD8 are disposed in the vertical direction and connected to one vertical transfer path. Four electrodes per one photodiode PD are provided on the vertical transfer path, and so sixteen electrodes per four photodiodes are provided. The sixteen electrodes are supplied with the transfer pulses V1 to V16. Electric charges are accumulated in a low potential region. As seen from this potential transition diagram, as the potential changes, electric charges are transferred from the right to left in FIG. 8 along the vertical transfer path. Hatched photodiodes PD1 and PD5 are read in the thinning second mode.

Hatched charges 15 are at the height of the vertical transfer path same as that of the photodiode PD5 at the time t=0. As the time lapses, the charges 15 are transferred in the vertical direction (left side in FIG. 8). At time t=16, the charges are at the height of the vertical transfer path same as that of the photodiode PD1. It takes therefore 16 cycles to transfer the charges 15 from the height of the photodiode PD5 to the height of the photodiode PD1.

Next, a comparison is made between the vertical transfer time for the 4-electrode 4-phase drive (FIG. 4) and the vertical transfer time for the 16-electrode 16-phase drive (FIG. 8). From the following two reasons, the 16-electrode 16-phase drive can transfer charges in the vertical direction at higher speed than the 4-electrode 4-phase drive.

The first reason will be described. In the 4-electrode 4-phase drive, as described with reference to FIG. 4, it takes 32 cycles to transfer the charges from the height of the photodiode PD5 to the height of the photodiode PD1.

In the 16-electrode 16-phase drive, as shown in FIG. 8, it takes 16 cycles to transfer the charges 15 from the height of the photodiode PD5 to the height of the photodiode PD1.

Figure 2A:
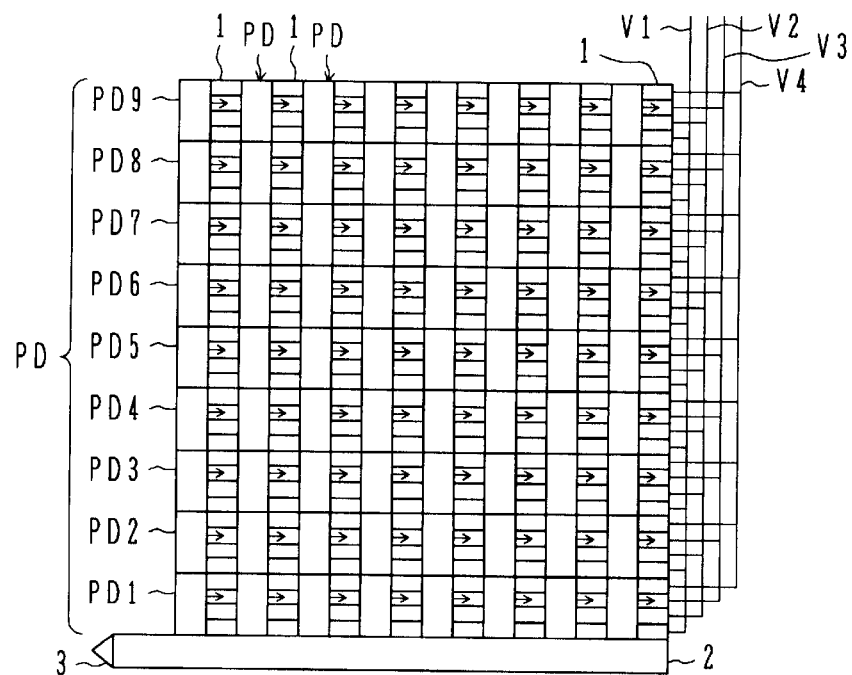
FIG. 2A is a plan view showing a solid state image pickup device operating in the first mode according to conventional technologies.
Figure 2B:
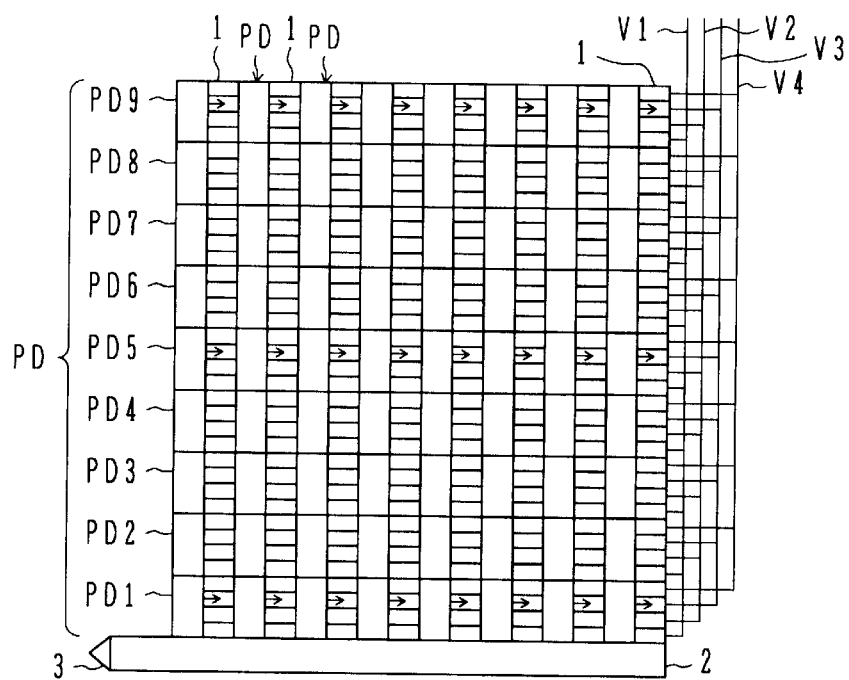
FIG. 2B is a plan view showing the solid state image pickup device operating in the second embodiment according to the conventional technologies.

As compared to the 4-electrode 4-phase drive, the 16-electrode 16-phase drive can shorten the vertical transfer time by a half (=16 cycles/32 cycles). In this embodiment (FIG. 6), the vertical transfer speed can be doubled as compared to the conventional technologies (FIG. 2B).

Next, the second reason will be described. As compared to the 4-electrode 4-phase drive, the 16-electrode 16-phase drive can reduce the number of electrodes per one pulse along the vertical transfer path by a quarter. Specifically, in the 4-electrode 4-phase drive, as shown in FIG. 2B, the pulse V1 for example is supplied to four electrodes per four photodiodes PD. In contrast with this, in the 16-electrode 16-phase drive, as shown in FIG. 6, the pulse V1 for example is supplied to one electrode per four photodiodes PD.

In the 16-electrode 16-phase drive, since the number of electrodes supplied with one pulse is reduced by a quarter, the load of a driver for supplying the pulse is reduced by a quarter. Applying the pulses V1 to V16 to the vertical transfer path is equivalent to applying the pulses V1 to V16 to the CR circuit (capacitors and resistors). If the number of electrodes is reduced by a quarter as described above, a CR time constant relative to the vertical transfer pulse is shortened by a quarter. Namely, as compared to the conventional technologies (FIG. 2B), the embodiment (FIG. 6) can quadruple the vertical transfer speed.

In this embodiment, the vertical transfer speed can be doubled from the first reason, and the vertical transfer speed can be quadrupled from the second reason. In this embodiment, therefore, the vertical transfer speed can be increased eight times in total. As the CR time constant becomes short, the charge transfer clock frequency can be raised. As the clock frequency becomes high, the charge transfer speed can be increased.

Also in this embodiment, it is possible to increase the capacity of one packet on the vertical transfer path. According to the conventional technologies shown in FIG. 4, the capacity of one packet corresponds to an area of two electrodes. According to the embodiment shown in FIG. 8, the charge storage capacity of one packet increases by a sevenfold (=14/2) as compared to the conventional technologies. In the embodiment, therefore, the transfer capacity of the vertical transfer path can be increased.

Also in this embodiment, influences of so-called smear can be reduced. The smear is a phenomenon that charges generated by strong light, e.g., strobe light reflected from window glass, leak into the vertical transfer path. Such smear charges are charges not desired. Next, the reason why the smear can be reduced will be described.

Electric charges normally read from a photodiode are called herein pixel charges. The pixel charges and the smear charges are mixed in the vertical transfer path. As the vertical transfer is repeated, the smear charges are accumulated in the vertical transfer packet. If a large amount of smear charges is generated in the vertical transfer path because of strong incidence light, charges may overflow from the packet and correct image signals cannot be read in some cases.

In this embodiment, since the capacity of the vertical transfer packet is large, even if smear occurs, charges do not overflow from the packet and the image quality deterioration by the smear can be suppressed. The operation of the second mode has been described above. Next, the first mode will be described. By devising the control method of the vertical transfer controller 12 of the solid state image pickup device, it is possible to switch between the first mode (4-phase drive) and second mode (16-phase drive).

FIG. 9 shows the structure of the solid state image pickup device operating in the first mode.

Figure 3:
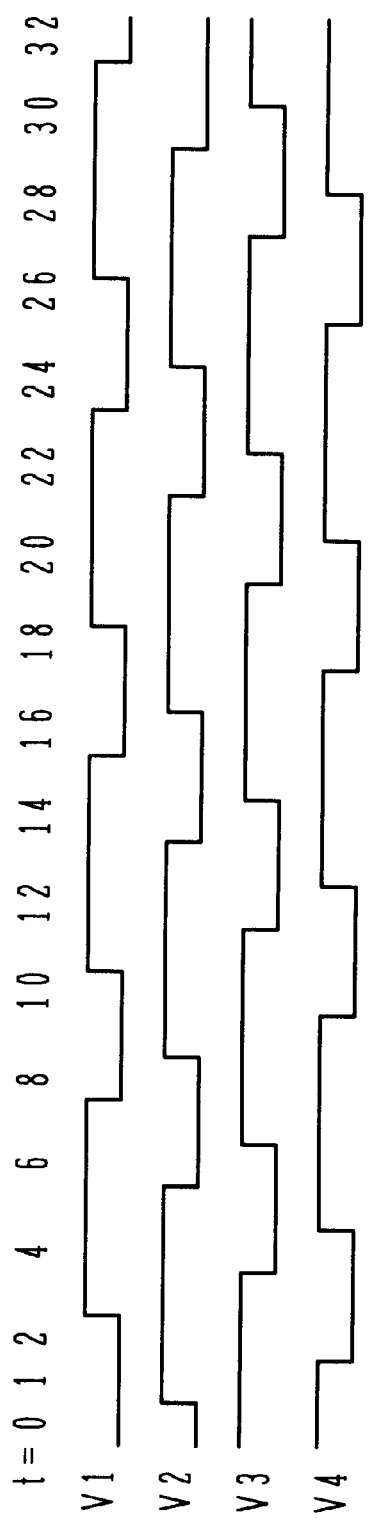
FIG. 3 is a timing chart of drive pulses used for four-electrode four-phase drive.

Upon reception of the first mode signal M1, the vertical transfer controller 12 generates 4-phase drive pulses V1 to V4 shown in FIG. 3 and controls the switches 13 shown in FIG. 8. The vertical transfer controller 12 opens the switches 13 corresponding to the pulses V5 to V16 and closes the switches 13 corresponding to the pulses V1 to V4 to thereby supply only the 4-phase pulses V1 to V4 among the 16-phase pulses V1 to V16 to the CCD chip 11.

For example, it is assumed as shown in FIG. 8 that the photodiode PD1 is assigned four electrodes VE1 to VE4, the photodiode PD2 is assigned four electrodes VE5 to VE8, the photodiode PD3 is assigned four electrodes VE9 to VE12, and the photodiode PD4 is assigned four electrode VE13 to VE16.

The switches 13 shown in FIG. 9 connect together the electrodes VE1, VE5, VE9, and VE13 and supply the pulse V1 thereto. The switches 13 connect together the electrodes VE2, VE6, VE10, and VE14 and supply the pulse V2 thereto. The switches 13 connect together the electrodes VE3, VE7, VE11, and VE15 and supply the pulse V3 thereto. The switches 13 connect together the electrodes VE4, VE8, VE12, and VE16 and supply the pulse V4 thereto.

The above connection by the switches 13 allows the vertical transfer path 1 to be driven into the same operation as the 4-phase drive illustrated in FIG. 4. In the first mode, electric charges are read from all the photodiodes PD and transferred in the vertical transfer path 1 through the 4-phase drive.

The control method by the vertical transfer controller 12 changes with which one of the first and second mode signals M1 and M2 is received. The vertical transfer controller 12 4-phase drives the vertical transfer path 1 in the first mode, and 16-phase drives the vertical path 1 in the second mode.

The solid state image pickup device can change the number of drive phases of the vertical transfer path 1 in accordance with the mode. In the first mode (all-pixel read mode), since a use rate of each packet in the vertical transfer path is high, the vertical transfer path is driven with a smaller number of drive phases (e.g., 4 phases). In the second mode (thinning read mode), since the use rate of each packet in the vertical transfer path is low, the vertical transfer path is driven with a larger number of drive phases (e.g., 16 phases).

The solid state image pickup device drives the vertical transfer path efficiently in accordance with the selected mode and can perform a vertical transfer suitable for the selected mode. In the second mode in particular, charges can be transferred in the vertical direction at higher speed and the transfer capacity of each packet can be made larger, than the first mode.

In the second mode, although the vertical transfer path is driven with sixteen phases, it may be driven with eight phases. However, charges can be transferred at higher speed with a larger number of phases.

For example, if M electrodes per one photodiode are provided for the vertical transfer path, M-electrode M-phase drive is possible in the first mode. In the second mode, if charges of one photodiode PD among N photodiodes PD in the vertical direction are read, $M \times 2^n$-electrode $M \times 2^n$-phase drive is possible where n is in the range from 1 or larger to $\log_2 N$ or smaller.

The present invention has been described in connection with the preferred embodiments. The invention is not limited only to the above embodiments. It is apparent that various modifications, improvements, combinations, and the like can be made by those skilled in the art.

What is claimed is:

1. A solid state image pickup device comprising:
    mode selecting means for selecting one of first and second modes;
    a plurality of photoelectric converters for converting received light into electric charges;
    transfer means having a plurality of packets for receiving the electric charges from the plurality of photoelectric converters and transferring the electric charges in each packet;
    gate means for reading the electric charges from each of the plurality of photoelectric converters and supplying the read electric charges to said transfer means; and
    drive means for driving said transfer means in the selected first or second mode at the number of drive phases different from the number of drive phases of the non-selected mode;
    wherein said gate means operates in such a manner that the number of the plurality of photoelectric converters read at the same time in the first mode is larger than the number of photoelectric converters read at the same time in the second mode.

2. A solid state image pickup device according to claim 1, wherein said drive means operates in such a manner that the number of drive phases in the first mode is larger than the number of drive phases in the second mode.

3. A solid state image pickup device according to claim 2, wherein:
    said transfer means has M electrodes per one photoelectric converter;
    said gate means reads the electric charges from one photoelectric converter per N adjacent photoelectric converters in the second mode; and
    said drive means drives said transfer means with $M \times 2^n$ (n is in a range from 1 or larger to $\log_2 N$ or smaller) phases.

4. A solid state image pickup device according to claim 3, wherein:
    said gate means reads the electric charges from all of the plurality of photoelectric converters in the first mode; and
    said drive means drives said transfer means with M phases in the first mode.

5. A solid state image pickup device according to claim 3, wherein said drive means drives said transfer means with four phases in the first mode and with eight or sixteen phases in the second mode.

6. A solid state image pickup device according to claim 5, wherein said drive mans drives said transfer means with sixteen phases in the second mode.

7. A charge transfer method comprising the steps of:
    (a) selecting one of first and second modes;
    (b) reading electric charges from each of a plurality of photoelectric converters and supplying the read electric charges to transfer means; and
    (c) driving the transfer means in the selected first or second mode at the number of drive phases different from the number of drive phases of the non-selected mode;
    wherein said step (b) operates in such a manner that the number of the plurality of photoelectric converters read at the same time in the first mode is larger than the number of photoelectric converters read at the same time in the second mode.

8. A charge transfer method according to claim 7, wherein said step (c) operates in such a manner that the number of drive phases in the first mode is larger than the number of drive phases in the second mode.

9. A charge transfer method according to claim 8, wherein:
    the transfer means has M electrodes per one photoelectric converter;
    said step (b) reads the electric charges from one photoelectric converter per N adjacent photoelectric converters in the second mode; and
    said step (c) drives said transfer means with $M \times 2^n$ (n is in a range from 1 or larger to $\log_2 N$ or smaller) phases.

10. A charge transfer method according to claim 9, wherein:
    said step (b) reads the electric charges from all of the plurality of photoelectric converters in the first mode; and
    said step (c) drives the transfer means with M phases in the first mode.

11. A charge transfer method according to claim 9, wherein said step (c) drives the transfer means with four phases in the first mode and with eight or sixteen phases in the second mode.

12. A charge transfer method according to claim 11, wherein said step (c) drives the transfer means with sixteen phases in the second mode.

13. A solid state image pickup device comprising:
    mode selecting means for selecting one of first and second modes;
    a plurality of photoelectric converters for converting received light into electric charges;

a vertical transfer device having a plurality of packets for receiving the electric charges from the plurality of photoelectric converters and transferring the electric charges in each packet;

a gate for reading the electric charges from each of the plurality of photoelectric converters and supplying the read electric charges to said vertical transfer device;

drive means for driving said vertical transfer device in the selected first or second mode at the number of drive phases different from the number of drive phases of the non-selected mode for receiving electric charges; and a horizontal transfer device receiving electric charges output from the vertical transfer device.

* * * * *